Nov. 6, 1956 — C. O. CHRISTENSEN ET AL — 2,769,291
CAN FILLING MECHANISM
Filed Nov. 26, 1952 — 3 Sheets-Sheet 2

INVENTORS
CARSTEN O. CHRISTENSEN
GEORGE H. VANIMAN
BY Strauch, Nolan & Diggins
ATTORNEYS

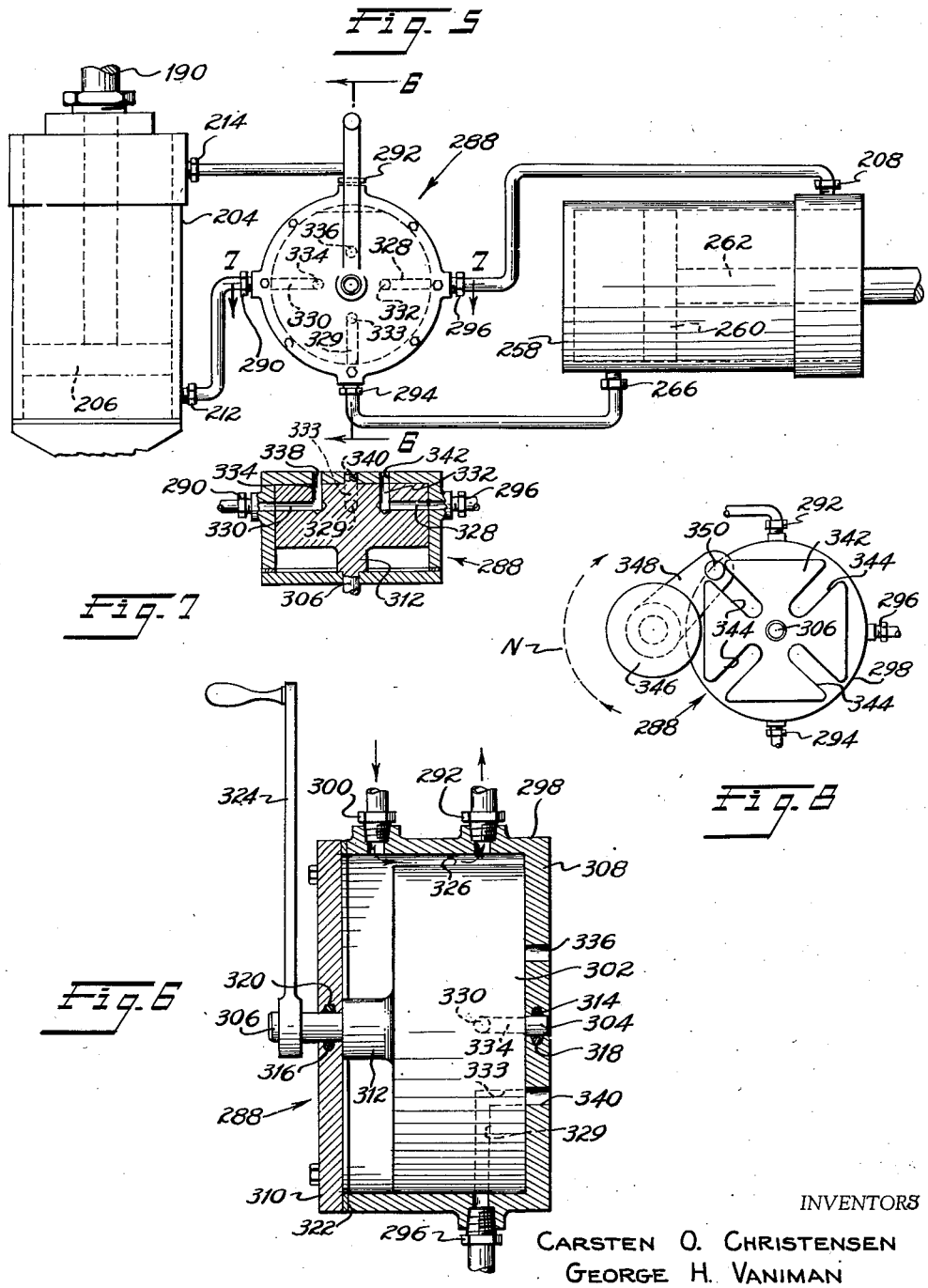

United States Patent Office 2,769,291
Patented Nov. 6, 1956

2,769,291
CAN FILLING MECHANISM

Carsten O. Christensen and George H. Vaniman, Bellingham, Wash., assignors to Bellingham Chain & Forge Company, Seattle, Wash., a corporation of Washington Application November 26, 1952, Serial No. 322,733

18 Claims. (Cl. 53—123)

This invention relates to can filling apparatus and more particularly to novel apparatus for automatically processing and packing elongated foodstuffs such as asparagus, string beans, and the like into containers.

This invention will be particularly disclosed in its preferred embodiment wherein a pre-selected amount of elongated foodstuff is automatically and consecutively gripped, delivered to a cutting station and cut to a desired length, and finally delivered to a packing station and packed into containers, without injury to the foodstuff.

A major object of this invention is to provide novel mechanism for automatically processing and packing elongated foodstuffs.

A further object of this invention is to provide a novel can filling device having novel closure mechanism for handling of foodstuffs.

Another object of this invention is to provide novel means for intermittently rotating a can filling device to index said device at successive processing stations.

Yet another object of the invention is to provide a novel can filling device for handling elongated foodstuffs and having a novel ejecting device for packing the foodstuff into containers without injury.

Still a further object of this invention is to provide a novel can filling device having an actuator mechanism and foodstuff ejector mechanism and a novel valve means for coordinating the operation of the actuator and ejector.

A further object of this invention is to provide a novel can filling device adapted to be intermittently indexed to a series of processing stations and having novel lock and release mechanism for holding and releasing the device respectively at its various indexed positions.

Another object of this invention is to provide a novel can filling device adapted to be intermittently indexed to a container filling station and having concomitantly indexed container carrying means and support mechanism for respectively delivering and supporting containers at the container filling station.

Still another object of this device is to provide a container filling device comprising a series of equally spaced closure elements for successively receiving and delivering elongated foodstuff to cutting and ejecting stations, actuating mechanism for intermittently rotating and indexing the closure elements at the various stations, container carriers coordinately indexed with the closure elements for delivering containers to the ejecting station, and an ejector for moving the foodstuff from the elements into the containers.

Further objects and advantages will become apparent as the description proceeds in connection with the accompanying drawings in which:

Figure 4 is a sectional view taken along the line 4—4 of Figure 1 showing the details of the lock for accurately locating the closure means at each station;

Figure 5 is a schematic diagram of the actuating and container loading mechanism showing means for operating these mechanisms in timed relation;

Figure 6 is a sectional view taken along the line 6—6 of Figure 5 showing the details of the selector valve for correlating the operation of the actuating and container loading mechanism;

Figure 7 is a sectional view taken along the line 7—7 of Figure 5 showing the drain passages within the valve for draining the actuating and ejecting cylinders; and Figure 8 is a top plan view of the four-way valve showing mechanism for automatically intermittently rotating the valve.

Figure 1:
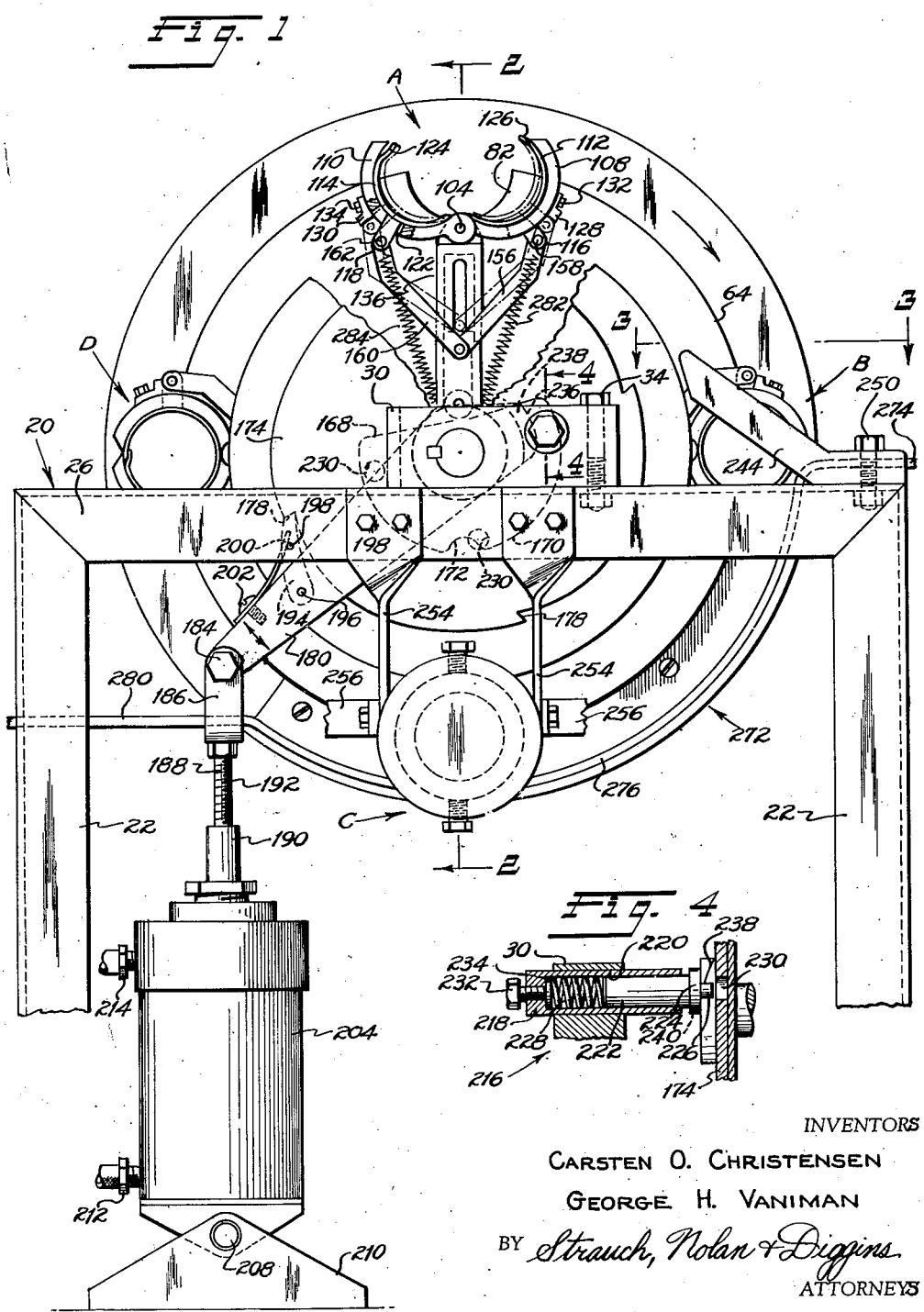
Figure 1 is a front elevational view partly cut away of the present invention showing the cam actuated closure means, severing station, can filling station, and the intermittently driven actuating mechanism.
Figure 2:
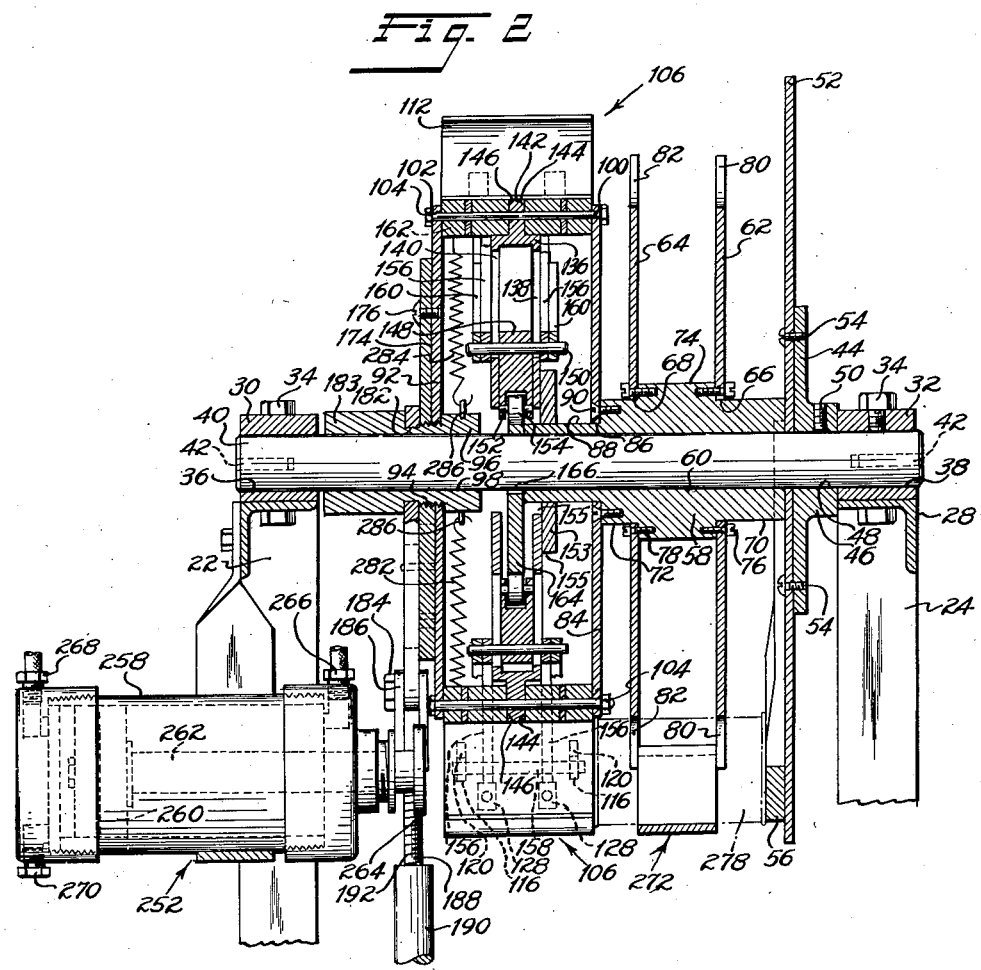
Figure 2 is a sectional view taken along the line 2—2 of Figure 1 showing details of the closure mechanism, can support mechanism, and the intermittently actuated ejector mechanism.
Figure 3:
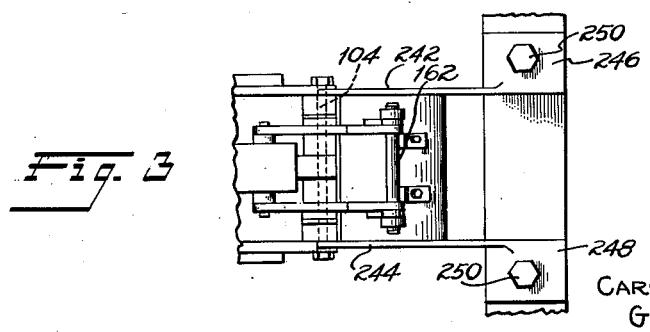
Figure 3 is an elevational view looking in the direction of line 3—3 of Figure 1 showing the spaced severing apparatus and the details of the closure means.

Referring to the drawing wherein like reference numerals designate corresponding parts throughout the several figures there is shown in Figure 1 a stationary frame member generally designated 20, preferably constructed of angle iron, comprising two pairs of vertical legs 22 and 24 in spaced relation. Transverse members 26 and 28 are rigidly secured to each pair of legs to provide mounting means for the apparatus. A pair of stationary mounting members 30 and 32 are respectively rigidly secured to transverse members 26 and 28 as by bolts 34. The mounting members 30 and 32 are provided with cylindrical bores 36 and 38, respectively, for receiving the opposite ends of shaft 40. Bores 36 and 38 and the respective ends of shaft 40 are also provided with aligned grooves for operatively receiving key member 42 therebetween in order to hold shaft in non-rotating relation with respect to frame 20.

Disc 44 having an integral boss 46 is provided with a through bore 48 for mounting on shaft 40. Set screw 50 is threadedly mounted in the boss and effectively holds the disc 44 stationary with respect to the shaft. Can support platform 52 is rigidly secured to disc 44, as by screws 54, and is provided at one face through a portion of its circumference with a rigidly mounted cam 56 having a pair of spaced inclined surfaces extending from the face of plate 52 to a portion of maximum height interconnecting the inclined surfaces and extending parallel to the face of the platform 52, the purpose of which will be hereinafter explained.

Hub member 58, preferably of bearing bronze, is provided with a centrally disposed bore 60 for rotatively mounting the hub on shaft 40 in abutting relation with plate 52. A pair of can carriers 62 and 64, having centrally disposed apertures 66 and 68 respectively are mounted in spaced relation on portions 70 and 72, respectively of hub 58 in contacting relation with opposite faces of enlarged portion 74. The carriers are secured to a respective face of portion 74, as by screws 76 and 78, so that carriers 62 and 64 rotate with hub 58. Carrier 62 is provided with four equally spaced container or can receiving pockets 80 extending inwardly from the periphery of carrier 62 and in axial alignment with identical pockets 82 similarly disposed in carrier 64.

Hanger member 84 is a disc-like plate having an aperture 86 for mounting the hanger on portion 88 in contacting relation with a face of portion 72 of hub 58, and is rigidly secured to the face as by screws 90. A second hanger 92 having a threaded aperture 94 is threadedly secured on bearing member 96 having an aperture 98 for rotatively mounting the bearing on shaft 40. The hangers 84 and 94 are provided with four equally spaced peripheral holes 100 and 102 in respective axial alignment for operatively receiving pivot pins 104 of four closure box elements or grippers, generally designated 106 mounted between hangers 84 and 94 in equally spaced relation for rotation with the hangers. Each closure box assembly comprises a pair of semi-cylindrical arms or members 108 and 110 each having one end pivotally mounted on bolt 104. Also pivotally mounted on bolt 104 and in contact with the inner peripheries of members 108 and 110 are a pair of flexible semicylindrical arms or linings 112 and 114, respectively, preferably of stainless steel. The linings 112 and 114 are provided with lugs 116 and 118, respectively, rigidly secured as by welding to the outer periphery of said linings and extending through and beyond a pair of slots 120 and 122 in members 108 and 110 respectively. Lining 114 has a portion 124 at the end thereof inwardly spaced from member 110 and lining 112 has a portion 126 extending beyond the end of 108. Two pairs of stops 128 and 130 are rigidly secured in spaced relation as by screws 132 and 134 to the outer periphery and adjacent the outermost ends of slots 120 and 122 of members 108 and 110 respectively for a purpose to appear.

A closure box actuating mechanism is associated with each closure box assembly and comprises a hollow cylinder 136 having diametrically opposed slots 138 and 140 and provided with an integral tongue portion 142, extending from one end of the cylinder, which is provided with an aperture for mounting the cylinder on bolt 104 intermediate hangers 84 and 92 in a slot formed by portions 144 and 146 of members 108 and 110 respectively.

Piston 148 is slidably mounted in cylinder 136 and has pin 150 rigidly mounted adjacent one end and extending through and beyond slots 138 and 140. The opposite end of piston 148 is bifurcated and provided with aligned holes for rigidly mounting shaft 152 on which cam roller 154 is rotatively mounted. A pair of connecting lever arms 156 are pivotally mounted at one end on pin 150, at opposite sides of cylinder 136, and are pivotally connected at their other ends to pin 158 pivotally mounted in apertures in the lugs 116, which are rigidly secured to lining 112. A second pair of connecting arms 160 are similarly pivotally mounted on pin 150 overlying arms 156 and are pivotally connected at their other ends to pin 162, pivotally mounted in apertures in lugs 118 which are rigidly secured to lining 114.

Cam roller 154 is in operative engagement with cam 164 which is mounted on shaft 40 and held in non-rotative rotation with respect to said shaft as by key 166. Cam 164 comprises a flat inclined surface 168 and smooth arcuate surface 170 interrupted at its lowermost point by a recessed indentation or dwell 172. The opening and closing of the closure box assembly is controlled by the configuration of the cam as will hereinafter become apparent.

Bearing plate 153 is rotatively mounted on hub member 58 and is rigidly secured to each of the hollow cylinders 136 as by welds 155 in order to rigidly hold all of the cylinders in the same plane to assure accurate contact of cam roller 154 with cam 164.

Actuating plate 174 is also threadedly mounted on bearing member 96 and is secured to hanger 92 as by screws 176. Four equally spaced notches 178 are cut in the periphery of plate 174 to operatively receive a pawl which imparts rotation to the plate and hanger-closure box assembly.

Operating arm 180 is provided at one end with bore 182 for mounting the arm on rotatably mounted bearing 183 contiguous to the end of bearing member 96 and an exposed face of actuating plate 174. The opposite end of arm 180 is pivotally connected by pin 184 in the bifurcated end 186 of piston rod extension 188, adjustably connected to piston rod 190 as by threads 192. Pawl 194 is pivotally mounted on arm 180 as by pin 196 and is provided with upstanding pin 198 operatively engaging one end of leaf spring 200 mounted on an edge of arm 180 as by screw 202. Leaf spring 200 exerts a biasing force on pawl 194 tending to hold the pawl in engagement with one of the notches 178.

Piston rod 190 is reciprocably mounted in double acting hydraulic cylinder 204 and has a disc shaped piston 206 connected at one end, as schematically shown in Figure 5. Suitable sealing means (not shown) prevent leakage of the fluid medium in the cylinder from one side of piston 206 to the other. Similarly, sealing means (not shown) are employed to prevent external leakage of the fluid medium.

Cylinder 204 is pivotally mounted on pin 208 on stationary frame 210, so that the upper end of the piston rod may move along the arc established by arm 180. A pair of hydraulic fittings 212 and 214 are mounted in the cylinder at opposite sides of piston 206.

In order to assure accurate locating of the closure box assemblies 106, a spring actuated positive lock generally designated 216 is mounted in mounting member 30, as clearly shown in Figure 4. Hollow body 218 is securely mounted in bore 220 of mounting member 30 and slidably receives piston 222 and having an enlarged collar portion 224 and locking portion 226. Spring 228 is mounted in hollow body 218 and bears against the end of piston 222 urging the piston toward plate 174 to permit portion 226 to selectively engage one of four holes 230 equally spaced in the face of plate 174. The amount of force exerted by spring 228 is controlled by adjustment screw 232 threadedly mounted in the end of hollow body 218 and having a disc 234 at one end in contact with the spring so that inward movement of adjusting screw 232 compresses spring 228.

To release the lock to permit rotation of the device, end 236 of arm 180 is provided with inclined cam 238 which slidably passes between collar 224 and plate 174 when operating arm 180 is moved counterclockwise as viewed in Figure 1 to wedgingly remove locking portion 226 from the hole 228. The under surface of collar 224 is cut away slightly as at 240 in the area of contact with cam 238, to permit the front edge of the cam to wedgingly engage the underside of the collar.

A pair of knives 242 and 244 having mounting portions 246 and 248, respectively, are secured to frame 20 as by bolts 250 in spaced relation to permit a closure box assembly 106 to pass therebetween. As is best shown in Figure 1 the cutting edges of the knives are disposed at an angle to the path of rotation of the closure box assembly 106 so that any projecting ends of the foodstuff in the closure box is moved progressively along the cutting edge and sheared.

The can filling mechanism generally designated 252 is rigidly mounted to frame member 26 as by metal straps 254 and 256 and is mounted for axial alignment with the closure box assemblies 106, as they are positioned at the can filling station, opposite indentation 172.

Can filling mechanism 252 consists of double acting cylinder 258 having piston 260 reciprocably mounted in the cylinder and connected to one end of piston rod 262. The opposite or exposed end of the piston rod is provided with disc 264 of a diameter just slightly less than the internal diameter of the can to be filled. Fittings 266 and 268 located at opposite sides of piston 260 provide fluid passages for admitting the fluid actuating medium to the desired side of the piston. Drain plug 270 is also provided in cylinder 258 for the purpose of manually draining the cylinder.

A container or can track generally designated 272 is rigidly mounted on frame 20 and comprises a generally straight feed portion 274 an arcuate portion 276 generally following the periphery of plate 52, in order to hold a can 278 in axial alignment with the can filling mechanism, and a generally straight discharge portion 280.

A pair of springs 282 and 284 are associated with each closure box assembly each being attached at one end to a loop 286 on bearing member 96 and having the other end attached to pins 158 and 162, respectively, whereby the pins 158 and 162 are drawn radially inwardly when cam roller 154 is on flat portion 168 of the cam and the arms 108 and 110 and linings 112 and 114 are resiliently moved to open position, as shown at the top of Figure 1.

Turning now to Figure 5 there is shown a schematic diagram of a manner of coordinating the actions of the actuating and can filling or ejecting mechanisms. Fourway valve generally designated 288 is provided with four outlets 290, 292, 294 and 296 connected respectively to the opposite ends of cylinder 204 and 258. In Figure 6 there is shown details of valve 288 which consists of housing 298 having the four operating outlets and main inlet 300. Selectively positionable cylinder 302 is mounted in close fitting relation in the housing and has journals 304 and 306 rotatively mounted in the base 308 and coverplate 310, respectively. Enlarged bearing boss 312, integral with the cylinder, bears against coverplate 310 and prevents any axial movement of cylinder 302. Seals 314 and 316 mounted in grooves 318 and 320 of the base and coverplate, respectively, and gasket 322 provided between coverplate 310 and housing 298 prevent exterior leakage of the fluid medium. Journal 306 extends exteriorly of coverplate 310 and is adapted to be turned by handle 324 or by an automatic timed movement such as a Geneva movement (schematically shown in Figure 8).

Cylinder 302 is provided with a flat portion 326 which is positionable at the four outlets, by handle 324, to permit fluid entering the housing through inlet 300 to pass the flat portion to a selected outlet for a desired function. In order to drain non-operating fluid from each of the cylinders 204 and 258 cylinder 302 is provided, as shown in Figure 5, with inwardly extending bores 328, 329 and 330 which connect at their innermost ends, with vertical bores 332, 333 and 334 respectively. Four equally spaced holes 336, 338, 340 and 342 are provided in base 308 of housing 298 and are arranged so that vertical bores 332, 333 and 334 can each be sequentially aligned with each of the holes as the cylinder 302 is selectively rotated. As a result of this arrangement the outlet passages which are closed to actuating fluid by cylinder 302 are all opened to drain and any non-actuating fluid in cylinders 204 and 258 is allowed to drain off.

For ease in understanding the operation of the novel container filling device the gripping, shearing, filling, and non-functioning stations will be respectively designated; A, B, C and D.

With the device in the position shown in Figure 1 a selected bunch of asparagus, cut beans, or the like is placed in the open closure box at A, by hand or by suitable automatic means. Handle 324 is then rotated counterclockwise to position flat portion 326 of the cylinder 302 opposite outlet 290 to permit fluid entering inlet 300, of valve 288, to pass through outlet 290 and the connecting line to the lower side of piston 206 which causes the piston to move upwardly. This motion is transmitted to operating arm 180, pawl 194 operatively engaging one of the slots 178 to thereby rotate plate 174. Rotation of plate 174 is in turn imparted to the hangers 84 and 92 and the closure box assemblies 106.

As the closure box shown at A in Figure 1 starts to rotate cam roller 154 rolls up inclined surface 168 of cam 164 which forces piston 148 and arms 156 and 160 upwardly. Since arms 156 and 160 are respectively connected to pins 158 and 162 which are in turn connected to linings 112 and 114, the linings are forced inwardly toward each other until lugs 116 and 118 reach the ends of slots 120 and 122 as shown in dotted lines in Figure 1. This initial partial closing of linings 112 and 114 is to permit the linings to grip the foodstuff therein sufficiently to prevent any of the foodstuff from falling out during rotation of the closure box toward station B. Further movement of piston 148 causes pins 148 and 162 to engage stops 128 and 130 respectively and simultaneously completely close linings 112 and 114 and semicircular members 108 and 110 so that portion 126 is disposed between portion 124 and the inner periphery of member 110 to firmly grip foodstuff therein.

Assuming that a bunch of asparagus, or the like had already been placed in the closure box shown at B, then upon continued rotation of the device the closure box assembly at A would move to B where the asparagus therein would be severed to correct size, and the closure box assembly at B would be moved to C. At the same time containers or cans fed to track 272 in the vicinity of station B, by hand or suitable automatic means, would be picked up in pockets 80 and 82, which are indexed with respect to the closure boxes of carriers 62 and 64, respectively, and moved to station C up inclined surface of cam 56 so that a can at station C will be forced tightly against the closure box at C. The engagement of locking portion 226 in one of the four holes assures proper indexing of the closure box elements. In order to be sure that a hole 230 will always be positioned for engagement with locking portion 226 toward the end of an actuating stroke piston 206 is provided with sufficient travel to rotate actuating plate 174 through slightly more than 90°. In this manner as a hole passes beneath the lock 216 locking portion 226 will be biased into engagement with a hole 230 to lock the device and assure proper indexing. Thus at station C the can filling mechanism, closure box, and can are all in perfect axial alignment. At station C cam roller 154 moves slightly radially inwardly into recess 172 which results in a slight opening of the closure box at C to lessen the grip on the material therein to permit plunger 264 to eject the foodstuff from the closure box into the can with a minimum amount of effort thereby materially lessening chance of damage to the foodstuff. In order to eject the foodstuff from the closure box into a can at C handle 324 is moved to position flat portion 326 opposite outlet 294 which permits fluid to enter cylinder 258 and push piston 260 and consequently plunger 264 into the closure box to eject the foodstuff. With the valve opened to outlet 294 drain passages 328, 332 and 338 are connected to outlet 290. However, draining the lower side of piston 206 has no effect on the device since once piston 206 has moved to cause rotation of the device, positive lock 216 becomes operative through the engagement of portion 226 with one of the holes 230 in alignment therewith, to lock the device in the indexed position. Upon completion of the ejection operation the valve is opened to outlet 296 in order to withdraw plunger 264 from the closure box. At the same time outlet 294 is connected with drain passages 328, 332 and 340 to drain the opposite side of piston 260 to facilitate retracting movement of piston 260, drain passages 330, 334 and 336 are connected with outlet 292, and drain passages 329, 333 and 340 are connected with outlet 290. However since the device is held by positive lock 216 draining of either side of piston 206 has no effect. To unlock the device preparatory to a subsequent actuating or rotating stroke of piston 206 the valve is open to outlet 292 and fluid pressure forces piston 206 to move lever arm 180 in a counterclockwise direction as shown in Figure 1 and by this movement inclined cam 238 moves into engagement with collar 224 and wedgingly removes portion 226 from the aligned hole 230. At the same time drain passages 330, 334 and 338 are connected to outlet 290 to drain the opposite side of piston 206 and drain passages 328, 332 and 342 and 329, 333 and 340 are connected to outlets 296 and 294 respectively to drain both sides of cylinder 258.

Upon the next actuating stroke of piston 206 each closure box is repositioned at the next or subsequent station and carriers 62 and 64 are simultaneously rotated so that a container or can in pockets 80 and 82 at station C is rotatively moved until it falls from the pockets, by gravity, and is carried away from the device on track portion 280.

Turning to Figure 8 there is shown an apparatus for automatically intermittently rotating the valve for selectively directing actuating fluid to the desired actuating member. Driven member 342 is securely mounted on shaft 306, in place of handle 324, and is provided with four radially inwardly extending equally spaced slots 344. A small electric motor 346 is mounted to one side and on a centerline of driven member 342. Crank arm 348 is secured at one end to the shaft of the electric motor and is provided with pin 350 at the other end for intermittent engagement with successive slots. Thus from the moment pin 350 rotatively engages a slot 344 until it leaves the slot, member 342 will be rotated 90° to position flat portion 326 of valve 288 opposite an outlet. The valve will remain in this position until the crank rotates, while disengaged from said member, through 270° indicated by dash line N, after which it will reengage the member and move the valve to the next operating position.

The food processing and can filling device described in the foregoing has been found, in practice, to provide a practical solution to the handling and packing of delicate foodstuffs such as asparagus, cut beans and the like in a simple and expeditious manner without detrimental effects on the foodstuffs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In a container filling device a frame; a shaft secured to said frame; hanger means rotatably mounted on said shaft; closure elements for receiving and gripping foodstuff mounted on said hanger means rotatable about said shaft; container carriers operatively connected to and in spaced axial alignment with said hanger means rotatably mounted on said shaft for rotatably carrying containers in axial alignment with respective closure elements; a fluid pressure operated actuator operatively connected to a portion of said hanger means for simultaneously intermittently rotating and indexing consecutive closure elements and respective container carriers at successive stations; a fluid pressure operated ejector mounted on said frame in axial alignment with respective closure elements and containers at one of said stations for moving foodstuff from said closure elements into said containers at said one station; and valve means operatively connected to said actuator and ejector for coordinating sequential operations of said actuator and ejector.

2. In a container filling device a frame; a shaft secured to said frame; hanger means rotatably mounted on said shaft; closure elements for receiving and gripping foodstuff mounted on said hanger means and rotatable about said shaft; container carriers operatively connected and in spaced axial alignment with said closure elements rotatably mounted on said shaft for rotatably carrying containers in axial alignment with respective closure elements; a double acting fluid operated actuator operatively connected to a portion of said hanger means for simultaneously intermittently rotating and indexing consecutive closure elements and respective container carriers at successive stations; a double acting fluid operated ejector mounted on said frame in axial alignment with respective closure elements and containers at one of said stations for moving foodstuff from said closure elements into said containers at said one station; and a selectively positionable valve operatively connected to said actuator and ejector for sequentially directing actuating fluid to said actuator and ejector to permit consecutive operations of said actuator and ejector.

3. In a container filling device a frame; a shaft secured to said frame; hanger means rotatably mounted on said shaft, closure elements for receiving and gripping foodstuff mounted on said hanger means and rotatable about said shaft; container carriers operatively connected to and in spaced axial alignment with said closure members rotatably mounted on said shaft for rotatively carrying containers in axial alignment with respective closure elements; an actuator piston reciprocably mounted in a fluid cylinder operatively connected to a portion of said hanger members for simultaneously intermittently rotating and indexing consecutive closure elements and respective container carriers at successive stations; a pair of fluid lines connected to said cylinder for directing actuating fluid to either side of said actuator piston; an ejector cylinder mounted on said frame in axial alignment with respective closure elements and containers at one of said stations; an ejector piston reciprocably mounted in said cylinder for moving foodstuff from closure elements indexed at said one station into respective container; a pair of fluid lines connected to said cylinder for directing actuating fluid to either side of said ejector piston; and a selectively positionable multiple drain valve having a fluid inlet and a plurality of outlets each connected to one of said fluid lines for sequentially directing fluid to said actuator and ejector pistons for consecuctively performing actuating and ejecting operations.

4. In a container filling device, a frame; hanger means rotatably mounted on said frame; a plurality of equally spaced closure elements mounted on said hanger means adapted to successively receive and grip predetermined quantities of foodstuff at a first position; a plurality of spaced container carriers operatively connected to said hanger means adapted to receive and hold containers in alignment with respective closure elements; means mounted on said frame operatively engaging said closure elements for successively opening and closing consecutive closure elements; actuating means operatively connected to said hanger means for simultaneously intermittently rotating and indexing said closure elements and carriers at successive positions; a plurality of cutters mounted on said frame at a second position to sever foodstuff delivered to said second position by successive closure elements; a selectively operable ejector mounted on said frame in a third position in alignment with successive closure elements and containers indexed to said third position adapted to eject said foodstuff from said elements into said containers; a support stationarily mounted on said shaft in spaced relation to said carriers for supporting the containers in said carriers; and a cam on said support having a maximum rise at said third position extending toward said elements whereby said carriers move said containers to said maximum rise in contiguous relation with the side of said elements when indexed to said third position.

5. In a container filling device, a frame; hanger means rotatably mounted on said frame; a plurality of equally spaced closure elements mounted on said hanger means adapted to successively receive and grip predetermined quantities of foodstuff at a first position; a plurality of spaced container carriers operatively connected to said hanger means adapted to receive and hold containers in alignment with respective closure elements; a fluid actuated cylinder; a reciprocable piston in said cylinder; means for connecting said piston to said hanger means; valve means for selectively connecting opposite sides of said piston to fluid pressure and exhaust for simultaneously intermittently rotating and indexing said closure elements and carriers in successive positions; a plurality of cutters mounted on said frame at a second position to sever foodstuff delivered to said second position by successive closure elements; a selectively operable fluid actuated ejector mounted on said frame in a third position in alignment with successive closure elements and containers indexed to said third position to eject said foodstuff from said closure elements into said containers; said valve means, also being operatively connected to said ejector for coordinating the action of said piston and ejector.

6. The device as set forth in claim 5 wherein said ejector comprises a fluid cylinder; a reciprocable piston therein; and means for selectively connecting opposite sides of said piston to fluid pressure and exhaust and wherein movement of said piston in a first direction ejects foodstuff from said closure elements and movement in a second direction positions said piston for a subsequent ejection.

7. The device as set forth in claim 5 wherein said valve means comprises a manually selectively positionable valve.

8. The device as set forth in claim 5 wherein said valve means comprises a selectively positionable valve, and automatic means operatively connected to the valve for intermittently rotating said valve to its selected positions.

9. In a container filling device, a frame; a shaft mounted on said frame; a pair of spaced hanger members rotatably mounted on said shaft; a plurality of equally spaced closure elements mounted on said hanger adapted to successively receive and grip predetermined quantities of foodstuff at a first position; a plurality of spaced container carriers operatively connected to said hangers adapted to receive and hold containers in alignment with respective closure elements; means mounted on said shaft operatively engaging said closure elements for successively opening and closing consecutive closure elements; an actuating disc rigidly secured to one of said hangers and having a series of equally spaced peripheral notches; actuating means having a portion adapted to sequentially engage said notches whereby intermittent rotation is imparted to said disc, closure elements and container by the successive engagement of said portion with each of said notches and whereby said closure elements and carriers are indexed at successive positions; a plurality of cutters mounted on said frame at a second position to sever said foodstuff delivered to said second position by successive closure elements; and a selectively operable ejector mounted on said frame in a third position in alignment with successive closure elements and containers indexed to said third position adapted to eject said foodstuff from said closure elements into said containers.

10. The device as set forth in claim 9 wherein said portion of said actuating means comprises an arm rotatably mounted on said shaft at one end and pivotally connected to said actuating means at the other end; and a pawl pivotally mounted on said arm intermediate the ends resiliently biased toward said disc to notch engaging position whereby movement of said arm by said actuating means imparts intermittent rotation to said actuating plate, closure elements, and carriers, by the successive engagement of said pawl with consecutive notches.

11. The device as set forth in claim 10 wherein said actuating means comprises a fluid cylinder; a piston reciprocably mounted in said cylinder responsive to fluid pressure; and a rod slidably mounted in said cylinder operatively connected at one end to said piston and at the other end to said arm whereby reciprocable movement of said piston is converted to oscillatory movement of said arm for intermittently rotating said actuating plate, closure elements, and carriers.

12. The device as set forth in claim 9 wherein each of said closure elements comprises a pair of grippers peripherally mounted between said hangers and pivotally connected to said hangers and each other; a plurality of levers for imparting movement to said grippers pivotally connected to each of said grippers at one end; and a reciprocable member disposed between each of said elements and said means in contact with and rotatable about said means, pivotally connected to the other end of said levers of respective pairs of said grippers whereby rotation about said means causes said members to reciprocate and alternately sequentially open and close respective pairs of grippers of successive closure elements.

13. The device as set forth in claim 12 wherein said means comprises a cam having a minimum and maximum rise; a roller attached to each of said reciprocable members in rolling contact with said cam whereby said grippers are alternately opened and closed by rotative movement of said roller about said cam from the minimum to the maximum rise; and resilient means operatively connected to said grippers resiliently biasing successive grippers to open position when respective rollers are located at the minimum position of said cam.

14. The device as set forth in claim 13 wherein said cam is mounted on said shaft with the minimum rise in alignment with said first position and said maximum rise in alignment with said second and third positions; a dwell in said cam at said third position extending inwardly away from said grippers at said third position whereby a roller and respective grippers at said third position are biased to a slightly grip releasing position to permit said ejector to remove said foodstuff from said grippers without damage.

15. The device as set forth in claim 12 wherein said grippers comprise a pair of pivotally mounted flexible semi-cylindrical arms; a second pair of semi-cylindrical rigid arms commonly pivoted with said flexible arms and encompassing said flexible arms each having peripheral slots; and lugs securely mounted on said flexible arms slidably mounted in and extending through said slots for pivotal connection with respective levers whereby said flexible arms are initially moved toward a closed position before said rigid arms are moved toward a closed position.

16. The device as set forth in claim 15 wherein one of said flexible arms is provided with a radially inwardly offset portion forming a space between said flexible arm and the respective encompassing rigid arm; an overhanging portion on the other flexible arm extending beyond the end of the respective encompassing rigid arm whereby said overhanging portion enters the space formed by said offset portion so that foodstuff within said arms is completely encircled.

17. The device as set forth in claim 15 wherein said rigid arms are each provided with a plurality of stops at one end of said slots engageable with the pivot member of respective lugs and levers whereby at the end of initial closing of said flexible arms the pivot members contact said stops to unitarily move and firmly close said rigid and flexible arms to firmly grip said foodstuff therein.

18. In a can filling mechanism having a loading station, a trimming station and a can filling station; a plurality of closure box assemblies, each assembly including a pair of arcuate elements; a hinge pin; means mounting each of said elements adjacent one end thereof on said pin for rotation about the axis of said pin; resilient means connected to each of said elements and operative to rotate each of said elements about said hinge pin to form a relatively shallow trough to facilitate loading said assemblies; support means for positioning a plurality of said assemblies in predetermined spaced relation; means for operating said support means to move said assemblies successively past said loading station, said trimming station and said can filling station; and actuating means including cam means effective after said elements pass said loading station to override said resilient means and rotate said elements about the axis of said pin to close said elements substantially completely at said trimming station and to partially close said elements at said can filling station.

References Cited in the file of this patent
UNITED STATES PATENTS

| | | |
|---|---|---|
| 1,417,610 | Kruse | May 30, 1922 |
| 1,855,675 | Hoffmeister | Apr. 26, 1932 |
| 1,869,120 | Thoeming et al. | July 26, 1932 |
| 2,042,186 | Peterson | May 26, 1936 |
| 2,044,813 | Rooney | June 23, 1936 |
| 2,165,096 | Frechette | July 4, 1939 |
| 2,180,349 | De Back | Nov. 21, 1939 |
| 2,344,913 | Ager | Mar. 21, 1944 |
| 2,345,073 | Rosett | Mar. 28, 1944 |
| 2,443,333 | Tucker | June 15, 1948 |
| 2,542,133 | Gorby | Feb. 20, 1951 |
| 2,578,833 | Pearson | Dec. 18, 1951 |